Oct. 13, 1970  C. M. BOUDETTE ET AL  3,533,270
APPARATUS FOR FORMING HEAT TRANSFER DEVICE
Original Filed Nov. 30, 1962  5 Sheets-Sheet 1
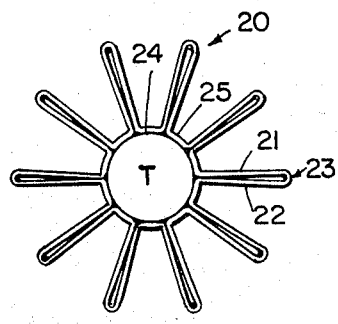
FIG.1
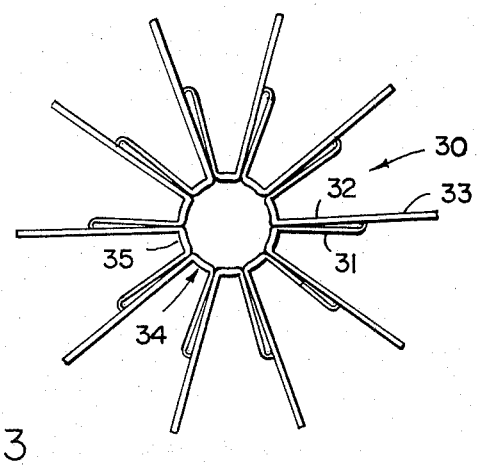
FIG.3
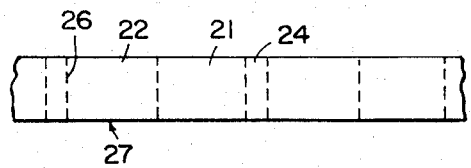
FIG.2
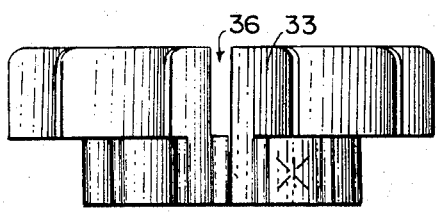
FIG.4
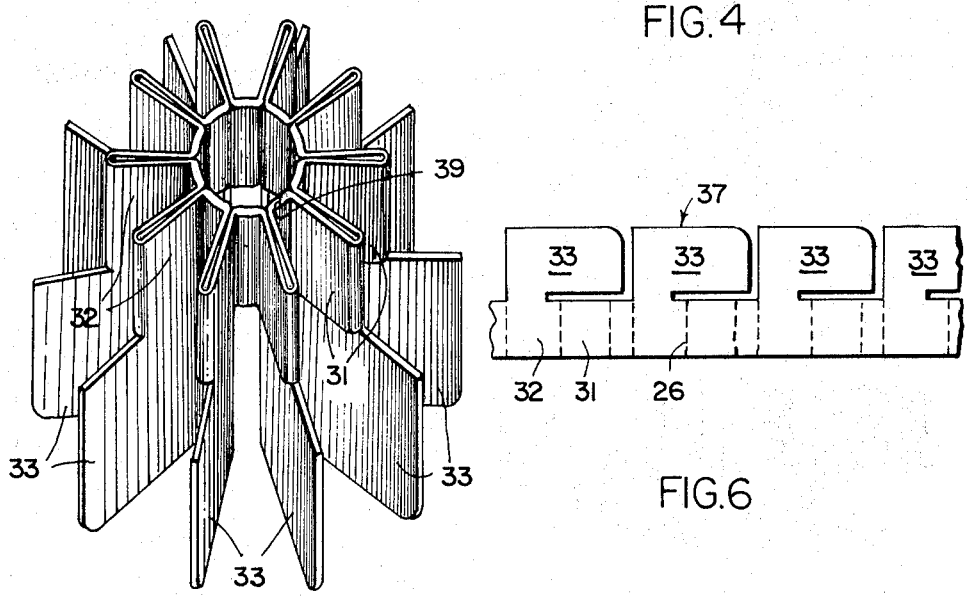
FIG.5
FIG.6
INVENTORS
CLAYTON M. BOUDETTE
LAURICE F. BOUDETTE
BY
Wolf, Greenfield & Hieken
ATTORNEYS Oct. 13, 1970  C. M. BOUDETTE ET AL  3,533,270

APPARATUS FOR FORMING HEAT TRANSFER DEVICE

Original Filed Nov. 30, 1962

INVENTORS
CLAYTON M. BOUDETTE
LAURICE F. BOUDETTE
BY
Wolf, Greenfield + Hieken
ATTORNEYS INVENTORS
CLAYTON M. BOUDETTE
LAURICE F. BOUDETTE
BY
Wolf, Greenfield + Hieken
ATTORNEYS Oct. 13, 1970        C. M. BOUDETTE ET AL        3,533,270
APPARATUS FOR FORMING HEAT TRANSFER DEVICE
Original Filed Nov. 30, 1962                            5 Sheets-Sheet 5

INVENTORS
CLAYTON M. BOUDETTE
LAURICE F. BOUDETTE
BY
Wolf, Greenfield & Hicken
ATTORNEYS

United States Patent Office 3,533,270
Patented Oct. 13, 1970

3,533,270
APPARATUS FOR FORMING HEAT TRANSFER DEVICE
Clayton M. Boudette and Laurice F. Boudette, Revere, Mass., assignors to Wakefield Engineering Co., Inc., Wakefield, Mass., a corporation of Massachusetts
Original application Nov. 30, 1962, Ser. No. 241,408, now Patent No. 3,239,003, dated Mar. 8, 1966. Divided and this application Aug. 12, 1965, Ser. No. 485,974
Int. Cl. B21d 53/02
U.S. Cl. 72—402                             7 Claims

ABSTRACT OF THE DISCLOSURE

An apparatus is provided for forming finned heat transfer devices from a tubular blank. The apparatus has a plate defining a tubular blank receiving central portion with a plurality of radially extending spaced channels extending outwardly from the central portion. A plurality of elongated die members are slidably mounted in the channels. Means constantly urge the die members outwardly of the central portion and cam means are provided for simultaneously moving the die members toward the central portion to form a tubular blank into a finned member having a plural arcuate segmented encircling attachment wall.

RELATED APPLICATION

This application is a divisional application of applicants' parent application Ser. No. 241,408 filed Nov. 30, 1962 and now issued as U.S. Pat. 3,239,003.

The present invention relates in general to heat transfer and more particularly concerns a novel heat transfer device for exchanging heat between a contacting component and a surrounding fluid medium and methods and means of manufacturing such devices. A device according to the invention transfer heat with high efficiency, yet is low in cost, lightweight and relatively easy to manufacture according to the manufacturing aspects of the invention. Moreover, a single type of device fits a number of components of different sizes without sacrificing heat transfer efficiency, thereby reducing the inventory which must be kept on hand for use with components of different sizes.

Devices according to the invention are especially useful for cooling semiconductor devices, such as transistors. The maximum power handling capabilities of most transistors is a function of the transfer temperature. The importance of withdrawing heat from an operating transistor to maximize its dissipation capabilities is thus evident.

A typical prior art device suffers from a number of disadvantages. High thermal-conductivity requires a maximum of contact between semiconductor device and cooling device. But prior art devices, typically force-fitted to the semiconductor device, make limited contact with the device being cooled. Moreover, typical prior art devices are usually manufactured in a number of different sizes for a single transistor encapsulating can size because allowable tolerances in these cans are too great to be accommodated by a cooling device of a single size and still provide adequate cooling. Another disadvantage of a typical prior art device is its relatively high cost and weight. The nature of such prior art devices results in manufacturing techniques being relatively difficult, relatively slow and relatively costly.

Accordingly, it is an important object of this invention to provide an efficient, lightweight, low cost heat transfer device capable of being manufactured in large quantities at low cost while fitting devices to be cooled of a number of different sizes.

It is another object of this invention to provide a device in accordance with the preceding object which is automatically adjustable to resiliently and interchangeably engage varying dimensioned heat collecting or generating components.

Still another object of this invention is to provide a device in accordance with the preceding objects having a high ratio of area for exchanging heat with a surrounding fluid medium to the device weight.

It is still another important object of this invention to provide apparatus for forming a heat transfer device which achieves the preceding objects in a rapid and inexpensive manner.

It is still another object of this invention to provide apparatus in accordance with the preceding object which is relatively free from complexities, yet simultaneously forms a multitude of surface areas from a tubular blank with acceptable precision.

It is a further object of this invention to provide a rapid and efficient method of forming a heat transfer device in accordance with the proceding objects.

It is a still further object of this invention to provide a method in accordance with the preceding object which simultaneously forms a multitude of surface areas from a tubular blank with acceptable precision.

The heat transfer device in accordance with the invention has a segmented attachment wall for exchanging heat with a contacted device. Resilient means urge the wall segments together to maintain good thermal contact between the attachment wall and the contacted device. Heat exchange means, such as fins, extend downwardly from the attachment wall for establishing thermal contact with a surrounding fluid medium. Both the wall and the heat exchange means preferably comprise material of high thermal-conductivity. In a preferred form, the heat exchange means comprise substantially flattened U-shaped fins having adjacent walls integrally joining adjacent segments of the attachment wall and function also as the resilient means for urging the wall and segments together. The fins may be varied in size or provided with extensions or projections to increase heat transfer to a surrounding fluid medium.

Apparatus in accordance with this invention for making the novel devices comprise a first forming section comprising means for forming fins on a tubular blank and cam means for actuating the forming means. A second feeding section of the machine comprises a means for positioning and retaining a tubular blank in engagement with the forming means, and a mandrel means for the tubular blank. A third linkage section has a first linkage means operatively engaging the means for positioning and retaining the tubular blank. A second linkage means operatively engages the cam means and a means simultaneously engages the first and second linkage means. In a preferred form according to the invention, the apparatus has a first forming means for receiving a tubular blank at a central portion of the forming means. A plurality of channels extend radially of the central portion. A plurality of die members each having first and second end portions are slidably mounted in the channels. Second means contact the first end of each die member for moving the die members towards the central portion to form heat exchange means between second ends of the die members. Third means move the die members away from the central portion.

The method in accordance with this invention comprises positioning a mandrel axially within and spaced from an inner surface of a tubular blank, and indenting selected portions of the tubular blank to form substantially U-shaped fins.

Numerous other features, objects and advantages of the present invention will become apparent from the following specification when read in connection with the accompanying drawings in which:

FIG. 1 is a top plan view of a preferred embodiment of a heat transfer device of this invention mounted on a transistor;

FIG. 2 is a fragmentary side view of an expanded blank for the device of FIG. 1;

FIG. 3 is a top plan view of an alternate embodiment of a heat transfer device of this invention;

FIG. 4 is a side view thereof;

FIG. 5 is a bottom perspective view thereof;

FIG. 6 is a fragmentary side view of an expanded blank for the device of FIG. 3;

Figure 7:
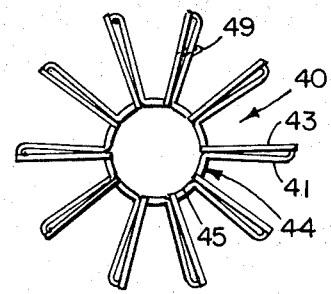
FIG. 7 is a top plan view of a further alternative embodiment of a heat transfer device of this invention.

With reference now to the drawing, and more particularly FIG. 1, the preferred embodiment of the heat transfer device is designated generally at 20. The device 20 is an integral unit having ten arcuate wall segments 24 which form a segmented generally circular or ring-shaped continuous attachment wall 25. The segments 24 are held in end-to-end relationship by rectangular walls 21 and 22 of substantially flattened U-shaped outwardly extending radial fins 23. The walls 21 and 22 of each radial fin 23 are resiliently biased towards each other, thus providing a spring tension which tends to return segments 24 to the position shown in FIG. 1 when the segments are forced apart.

Preferably good heat conducting materials such as copper, copper alloys and aluminum and aluminum alloys are employed in the device 20. These materials have an inherent resiliency which facilitates spring attachment of the heat transfer devices in use. In some cases, a thin surface layer such as a hard coating of black oxide over the devices is used to increase emissivity and enhance corrosion resistance.

The particular dimensions of the heat transfer device 20 may vary considerably depending upon its specific use. In the preferred embodiment the device 20 has an attachment wall diameter of 0.25 inch, a wall thickness of 0.01 inch and an overall fin diameter of 0.64 inch. The height of attachment wall 27 and fins 23 is approximately .18 inch.

The use of the heat transfer device 20 to cool varying sized components is extremely simple. For example, the device 20 may be used to exchange heat between a semiconductor device casing, shown diagrammatically at T in FIG. 1, and the atmosphere. The attachment wall 25 is force fit over an outer circular casing of the semiconductor. Due to the resiliency of the radial fins 23 and the segments 24, the wall 25 may be expanded or even changed in shape to conform to the shape of the semiconductor component. When in position on the semiconductor device the walls 21 and 22 urge the adjacent ends of segments 24 together, thus providing multiple point contact of the segments 24 with the semiconductor device casing. This contact is an important feature of the invention since it is possible to contact an underlying component at a number of surface areas under positive spring tension even though the contour of the surface to which the radial fin heat transfer device is attached may be irregular or may vary in size. It is a feature of this invention that contact of wall 25 takes place over substantially the entire arcuate surface areas of each segment 24.

In addition to spring action, the fins 23 play an important role in exchanging heat between the semiconductor device and the surrounding medium, usually air. The large surface area of the fins 23 contact this medium and transfer heat rapidly from the encircled semiconductor device to the surrounding medium. The degree of heat transfer, which is related to the thermal resistance of the device, may be controlled by varying such factors as the number, size and surface area of the fins 23.

With reference now to FIGS. 3–6, there is shown an alternate embodiment of the invention characterized by a still larger heat radiating surface. A heat transfer device 30 has an attachment wall 34 similar to attachment wall 25 with arcuate wall segments 35 similar to wall segments 24 of the device 20 in FIGS. 1 and 2. Walls 31 and 32 are similar to walls 21 and 22 of the device 20. However, wall 32 has an integral extension wing 33 which extends above the top edge of wall 31 and outwardly of the end of walls 31 and 32. Spaces 36 are provided above each attachment wall segment 35 and allow increased fluid circulation between the wings 33.

Figure 9:
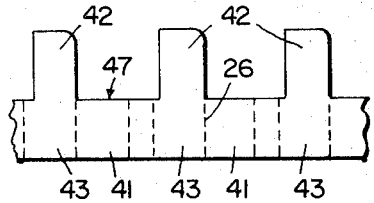
FIG. 9 is a fragmentary side view of an expanded blank for the device of FIG. 7.
Figure 8:
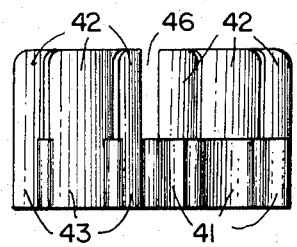
FIG. 8 is a side view thereof.

Referring to FIGS. 7–9 there is shown still another embodiment of the invention. The device 40 is similar to the devices 20 and 30. A resilient, plural segmented attachment wall 44 is provided having wall segments 45 similar to segments 24 of attachment wall 25. Walls 41 and 43 are similar to walls 21 and 22 above described, however, each wall 43 has an integral upwardly extending wing 42. Spaces 46 are provided between the wings 42 for increasing air circulation.

Although three specific embodiments of this invention have been described those skilled in the art may make numerous modifications of and departures from these embodiments without departing from the principles of the invention. For example, the devices need not be integral as described, but may have additional wings or extension fins attached by conventional methods such as soldering, crimping, etc. Although it is preferred that the fins be planar, in some embodiments it is possible to bend the wings into L-shapes in order to conserve space and reduce the outer diameter of the devices. Further, the attachment wall need not be continuous, i.e., a split attachment wall of the type indicated at split 39 in FIG. 5 may be employed. This expedient enables increased versatility of the devices since the attachment wall need not completely encircle an attached component. In some cases the devices may be made from noncontinuous strips of metal and welded or crimped together as for example at split 39 in FIG. 5 or crimp 49 in FIG. 7.

The heat transfer devices 20, 30 and 40 are preferably manufactured from tubular blanks 27, 37 and 47 respectively as shown in FIGS. 2, 6 and 9. Preferably the blanks 27, 37 and 47 are themselves formed from flat strips of preshaped metal which are rolled into a tubular form and welded at their ends. Subsequently the strips or tubular blanks are bent along fold lines 26 to form the corresponding heat transfer devices as will be more fully described. Although it is preferred to first form a tubular blank and then deform the blank simultaneously at fold lines 26 and later roll the preshaped element into a tubular configuration.

Having discussed the heat transfer devices and some methods of making them according to the invention, it is appropriate to consider apparatus for making the devices.

With reference now to FIGS. 10–14 an apparatus in accordance with this invention is designated generally at 50 mounted on a suitable base or table 51. The machine comprises generally three major sections, a forming section 52, a feeding section 53 and a linkage section 54.

Figure 11:
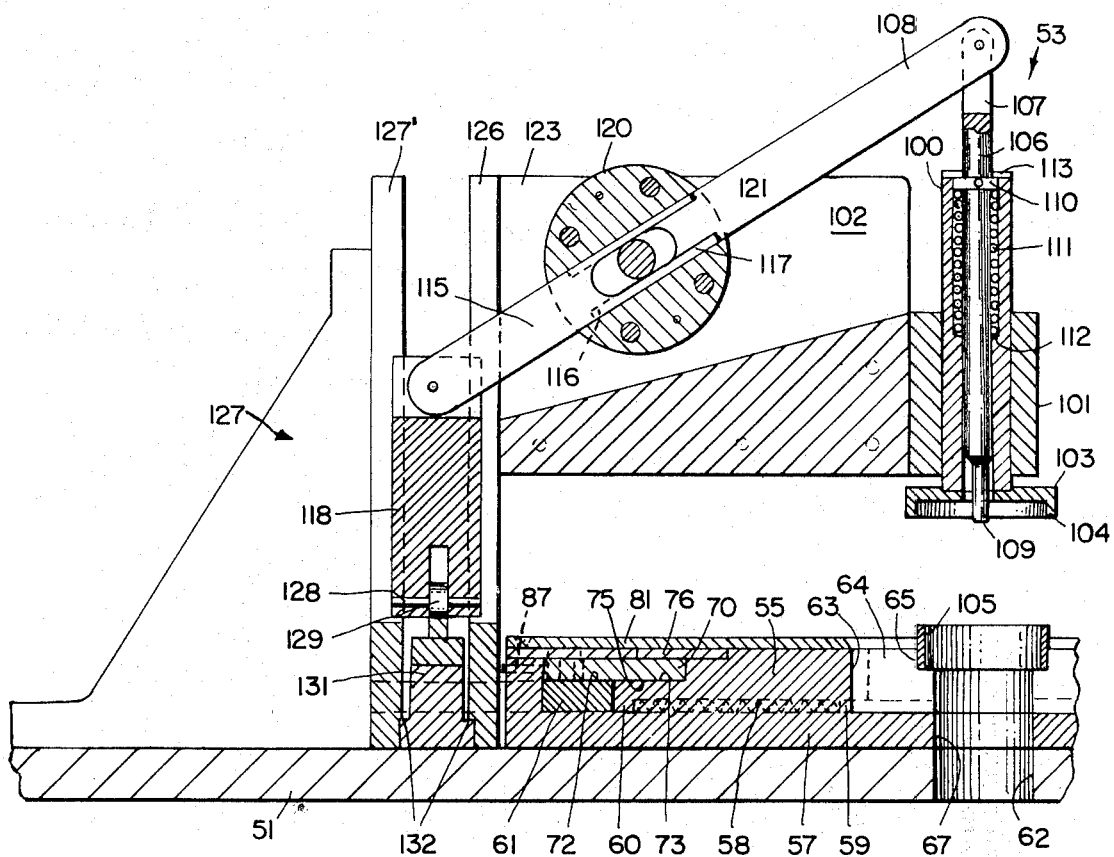
FIG. 11 is a side-sectional view taken through line 11—11 of FIG. 10.
Figure 13:
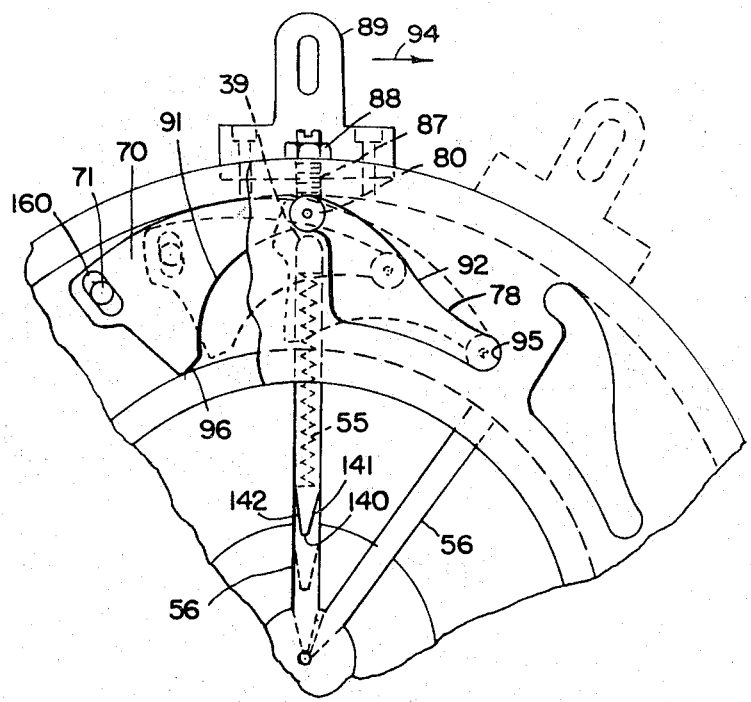
FIG. 13 is a fragmentary cross-sectional view taken through the cam arrangement of FIG. 10; and, FIG. 14 is a rear view of a machine of FIG. 10 looking to the left of a vertical plane passing between a vertical plate and cam section of the apparatus shown in FIG. 10.

The forming section 52 preferably has a series of ten equally spaced radially extending dies or forming members 55 individually reciprocally mounted in radially extending channels 56 within a central raised portion of a base plate 57. Each of the dies 55 has an inner arcuate wall 140 extending between angularly arranged walls 141 and 142 (FIG. 13). The dies 55 are constantly urged radially outwardly by sliding expansion springs 58 individually mounted in channels 56 below each die 55, as best seen in FIG. 11, with one end of each spring 58 affixed to an upstanding stop 59 rising from the base plate 57. An opposite end of each spring 58 urges a lip 60 of each die 55 outwardly against a cam pusher ring 61.

A countersunk hole 62 is centrally located at the base plate 57 and has an upper widened diameter countersunk portion 63. A preferably ring-shaped insert 64 is keyed into the countersunk portion 63 of hole 62. The insert 64 has a recessed circular inner portion 65 which acts as a means for receiving a tubular blank to be formed in the machine 50. Channels 66 are provided in the insert 64 and are aligned with corresponding channels 56 of the base plate 57. A centrally located tubular passageway 67 of the insert is aligned with the lower portion of hole 62. In effect, the insert 64 is an extension of and made integral with the base plate 57. However, the particular preferred construction allows interchangeability of various sized inserts thereby providing a means for forming varying dimensioned heat transfer devices. For example, inserts may be used in the machine having varying sized recessed circular inner portions 65.

Figure 10:
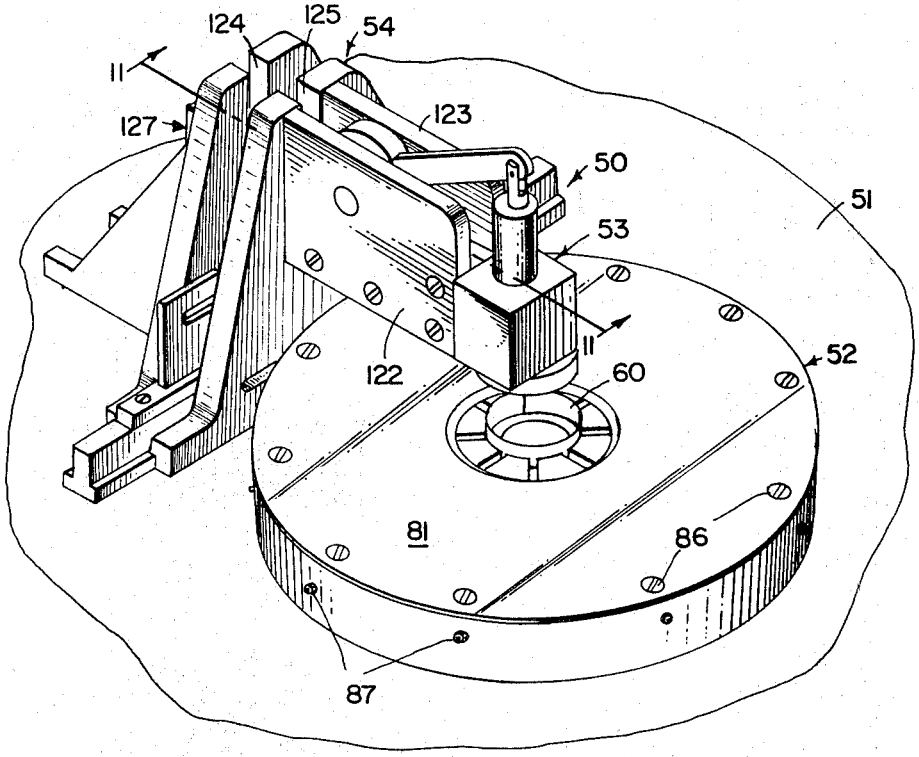
FIG. 10 is a perspective view of a preferred embodiment of an apparatus of this invention.
Figure 12:
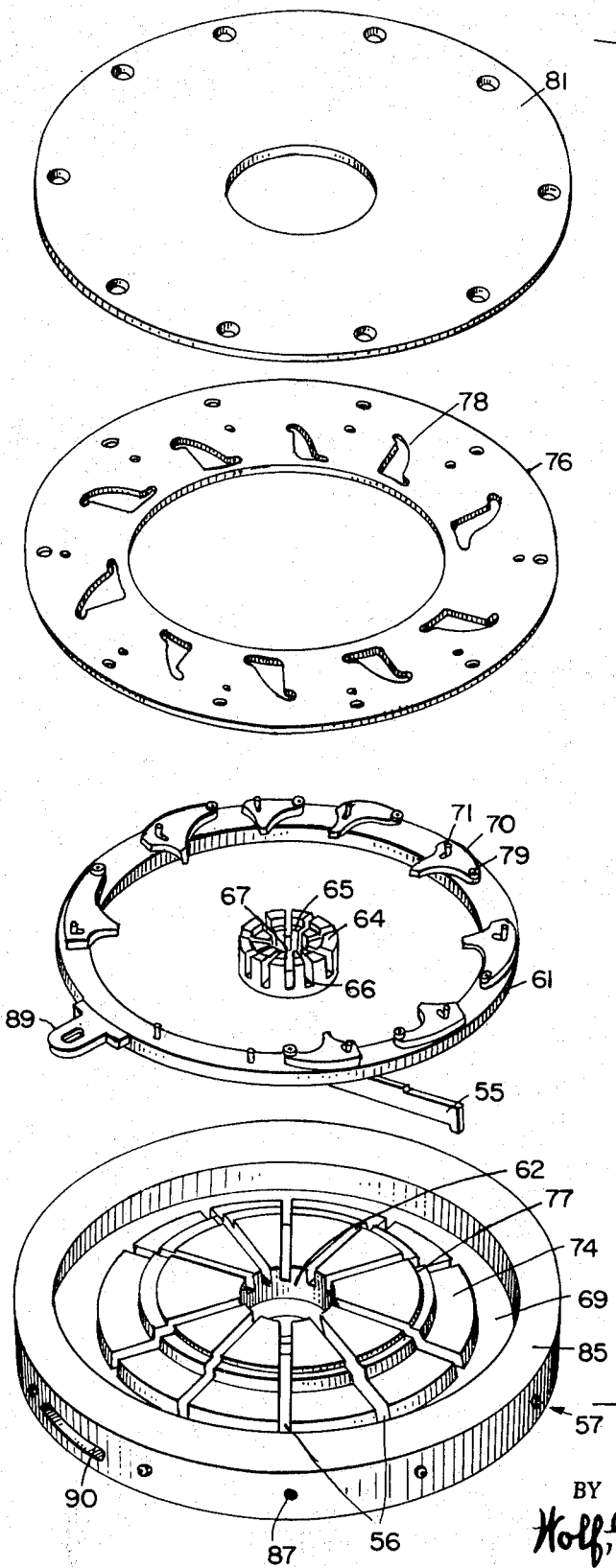
FIG. 12 is an exploded view of the cam arrangement of the machine of FIG. 10.
Figure 14:
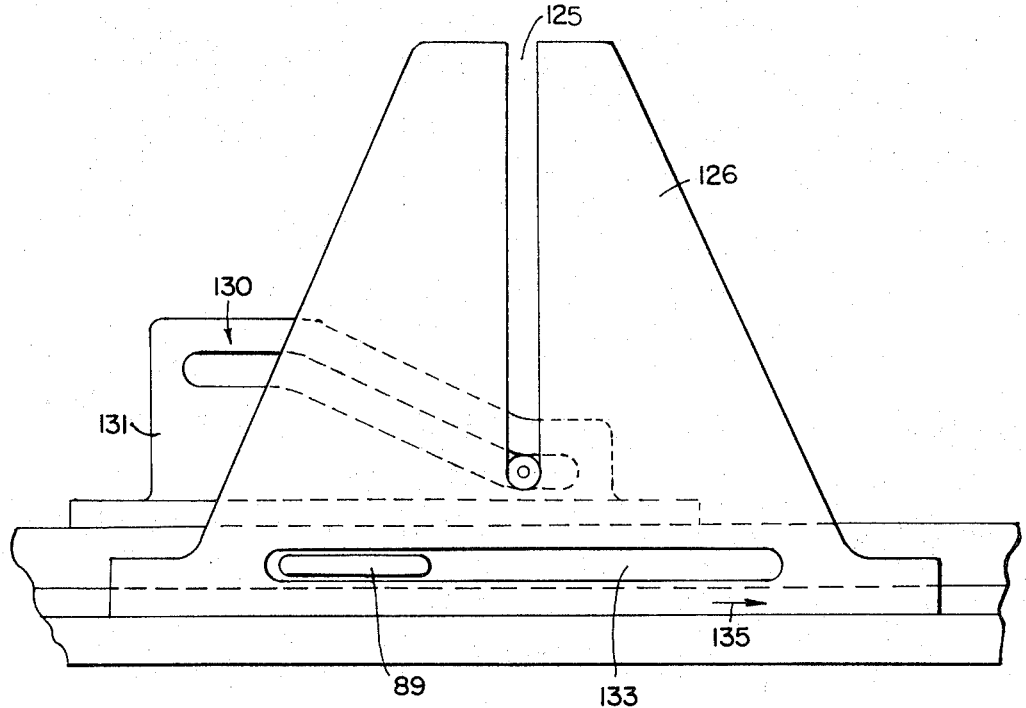

With reference now to FIGS. 11, 12 and 13, a cam pusher ring 61 is slidably mounted in a circular recess 69 in the base plate 57. A series of ten cams 70 are pivotably and slidably mounted on the top surface of the cam pusher ring 61 by pivot pins 71. The pivot pins 71 are affixed to ring 61 and pass into elongated notches 160 in cams 70 allowing the cams to pivot as well as slide in a general radial direction. Preferably, each of the dies 55 is actuated by an adjacent cam 70 pivotably mounted on the cam pusher ring 61. The outer portions of the lower surfaces 72 of the cams 70 rest on the top surface of the cam pusher ring 61 while the inner portion 73 rests on a step 74 of the base plate 57 and notches 75 in dies 55. A cam plate 76 is fixedely mounted on a step 77 of the base plate 57 and has ten cutout cam portions 78 circularly arranged thereon. Cam follow-up pins 79 have conventional pivotably mounted cam rollers 80 projecting upwardly from cam 70 into the cutout cam portion 78 of the cam plate 76. A cover plate 81 is bolted or fixed by suitable means to a rim 85 of the base plate 57. As best seen in FIG. 10, screws 86 positively retain both the cover plate 81 and the cam plate 76 on the rim 85 of the base plate 57.

A series of cam adjustment set screws 87 are mounted on the rim 85 of the base plate 57 and aligned with the radially extending channels 56. The set screws are received in the base plate by thread means and are positively located by conventional lock nuts 88. The set screws 87 form an adjustment for each of the cams 70 to adjust the slots 160 with relation to pins 71 and may be locked in varying radially located positions so as to contact the cam 70 and adjust their inward travel at points where the cams are aligned with the set screws 87 and channel 56.

A radially extending tongue 89 is integrally affixed to cam pusher ring 61 and projects through a horizontal elongated slot 90 in the rim 85 of the base plate 57.

The cams 70 each have an arcuate inner surface 91 which slidably engages outer ends of dies 55 as best shown in FIG. 13 illustrating a single die 55, cam 70 and corresponding cutout 78. Cam surface 91 and curved surface 92 of cutout 78 are designed to translate arcuately directed force to radially inwardly directed force against an outer end of die 55. Thus, arcuate movement of the tongue 89 from the position shown in full line in FIG. 13 through the position shown in dotted lines, causes arcuate inner surface 91 of each cam to move in the direction of arrow 94. The cams 70 simultaneously move radially inwardly and apply a radial force to each die 55. The innermost position of the dies 55 may be preset by adjustment of set screws 87 so that when pins 71 are aligned with set screws 87 and channels 56 and follower pins 79 have reached ends 95 of cutout 78 the inner edges 96 of the cams urge the dies 55 to their innermost position. Return of the tongue 89 to the position shown in full lines reverses the abovedescribed movements and allows the spring action of spring 58 to move each die outwardly against its corresponding cams 70.

The feeding section 53 of the machine comprises a tubular casing 100 slidably mounted and keyed to a horizontal extension block 101 which is in turn fixedly attached to a mounting plate assembly 127 as best seen in FIGS. 10 and 11. The tubular casing 100 passes vertically through the extension block 101 and has an integrally attached lower cup-shaped positioning means 103. The positioning means 103 preferably is a circular disc with a downwardly depending outer tubular rim 104 adapted to engage a tubular blank 105 which is positioned in the insert 64. A central rod or shaft 106 is slidably received within the tubular casing 100 and has a forked upper end 107 pivotably attached to a linkage arm 108. The lower end of shaft 106 forms a narrowed diameter mandrel end 109. A washer 110 is integrally attached to an upper portion of the shaft 106. A helical stripping spring 111 surrounds the shaft 106 and is biased between the integral washer 110 and an annular shoulder 112 of the casing 100. The casing 100 has an inturned upper rim 113 which acts as an upper stop for the integral washer 110.

When a downward pressure is exerted on forked end 107 of the shaft 106, the tubular casing 100 slides axially within extension block 101 and the positioning means 103 rests on top of the tubular blank 105 with the rim 104 surrounding the blank and firmly positioning the blank in the machine. Further movement of the shaft 106 compresses the stripping spring 111 and forces the mandrel 109 axially of the tubular blank 105 until the lowermost edge of the mandrel is substantially within a plane defined by the lowermost edge of the tubular blank. After the forming operation, to be described more fully below, the completed heat transfer device is formed around the mandrel 109 and the shaft 106 is raised. The heat transfer device tends to adhere to the mandrel but is stopped from upward movement by the positioning flange 103. The integral washer 110 and shaft 106 move axially upwardly with respect to the tubular casing 100, thus stripping the completed heat transfer device from the mandrel end 109.

As best seen in FIG. 11, the first linkage means for supplying power to the positioning means 103 comprises elongated arms 108 and 115 having forked ends 116 and 117 respectively. The arms 108 and 115 form a lever for transmitting power from a vertically sliding block 118 to the forked end 107 of the vertical shaft 106. It should be understood that any conventional joining means may be employed to transmit vertically directed forces from the sliding block 118 to the vertically mounted shaft 106. In the preferred embodiment, a circular linkage disc 120 has a central pin 121 passing axially of the disc and firmly affixed to parallel mounting plates 122 and 123 which are in turn integrally attached to the extension block 101 by screw means. A slot is provided in the circular disc 120 and receives arms 108 and 115 with forked ends 117 and 116 lying in side by side relationship and surrounding the circular pin 121. Reciprocal movement of the sliding block 118 causes the arms 108 and 115 along with disc 120 to act as a lever around pin 121 which acts as a fulcrum. The arms 108 and 115 slide adjacent to each other in the slot in the circular disc 120 as the disc 120 rotates to keep the horizontal distance between the pivoted ends of each arm and consequently the horizontal distance between shaft 106 and sliding block 118 substantially constant.

The vertical sliding block 118 is cross-shaped in cross section and is keyed within slots 124 and 125 (FIG. 10) which slidably mount the block 118 between vertically extending parallel support members 126 and 127' of the mounting plate assembly 127. A lower forked end of the vertical sliding block 118 carries pin 128 and freely rotatable roller 129.

The roller 129 is positioned within an angled slot 130 (FIG. 14), of a T-shaped lower horizontal slidable block 131. The slot 130 has horizontally extending end portions and an upwardly inclined connecting central portion. The T-shaped block 131 is keyed to lower shoulders 132 of parallel support plates 126 and 127' and is adapted to reciprocally slide in a horizontal direction on the table 51. Tongue member 89 of the cam pusher ring extends through aligned horizontal slots in members 126 and 127' and is engaged with a horizontal slot 133 in lower T-shaped portion of the lower horizontal sliding block 131.

The operation of the assembled machine of this invention will now be described. The resting position of the machine 50 is shown in FIGS. 10 and 11 with the positioning means 103 raised and the dies 55 spring biased against the cam pusher ring 61 and cams 70. A tubular blank 105 is positioned within the recess 65 of the insert 64. This positioning may be done by hand or by any conventional mechanical method. When forming the preferred heat transfer device of this invention as illustrated in FIG. 1, the tubular blank has a top edge which is positioned substantially on a plane passing through the top surface of the insert 64, and the rim 104 may be eliminated from the positioning means. When embodiments of the type shown in FIGS. 3 and 7 are formed the upper portion of the tubular blank projects above the top surface of insert 64.

A conventional power supply (not shown) for horizontally actuating the sliding block 131 is mounted for reciprocal motion at one end of the block. First horizontal movement of the sliding block 131 in the direction shown at 135 causes roller 129 to move upwardly along the angular slot 130. This movement forces the vertical sliding block 118 upwardly and accordingly causes the positioning means 103 to engage and firmly position the tubular blank 105 within the insert 64. Further movement of the vertical sliding block 118 causes the mandrel 109 to be depressed against the action of stripping spring 111 so that the mandrel is located axially of and within the tubular blank 105. At this point, the roller 129 reaches a horizontal end portion of the slot 130, and the tongue 89 is actuated by an end of slot 133 of the block 131 causing rotation of the cam pusher ring 61 in the direction of the arrow shown at 94 in FIG. 13. Dies 55 are simultaneously moved inwardly as shown by the dotted lines in FIG. 13 and thereby engage the tubular blank forming fins between walls 141 and 142 of adjacent dies. The centrally located attachment wall 25 is formed against the mandrel 109 and arcuate die ends 140.

Reciprocation of the T-slide block 131 in a direction opposite to its original movement returns the cam pusher ring 61 to its original position allowing springs 58 to return the dies 55 to their outermost radial position. Subsequently, the vertical sliding block 118 is returned to its original position and the positioning means and mandrel are raised.

Stripping action now takes place as above described and the completed heat transfer device may fall through the hole 62 into a collection zone or alternatively, may be removed from the upper portion of the machine.

The forming action of the radially disposed dies 55 has been found to be extremely successful in forming U-shaped fin members on tubular blanks. In the devices shown in FIGS. 1–9 the dies 55 are employed to simultaneously bend the blanks along the fold lines 26. Surprisingly the machine of this invention is versatile in that it not only may handle different sized blanks but may also form heat transfer devices having different configurations as illustrated in FIGS. 1–9. Note that in the case of blanks as shown in FIGS. 6 and 9, the dies 55 only touch the solid lower portion of the blank, allowing the wing or projections 42 and 33 to be automatically folded into their proper radial positions.

As will be understood from the above disclosure, a preferred method of this invention comprises first forming or providing a tubular blank from a pre-formed thin metallic strip. A second step is then performed comprising radially compressing preselected points on the blank to form radially extending fins between the areas compressed. Preferably the preselected areas are compressed simultaneously to provide an attachment wall around a centrally located mandrel.

Although there have been described particular preferred embodiments of the present invention, it is apparent that those skilled in the art may now make numerous departures from and modifications of these embodiments without departing from the inventive concepts. For example, the central mandrel may have a circular configuration as shown or rectangular, triangular and other configurations may be employed. The attachment wall of the heat transfer device may be circular, oval, triangular, etc. The fins themselves may not extend radially but may be offset from the central axis of the heat transfer device. In some cases, a split tubular blank may be employed and formed in the machine of this invention into a radial fin heat transfer device with the split being later joined by crimping, soldering or other techniques as desired.

Numerous other modifications may now be made by those skilled in the art without departing from the principles of the invention disclosed herein, hence, the invention is to be construed as limited only by the spirit and scope of the appended claims.

What is claimed is:

1. Apparatus for forming finned heat transfer devices having a plural arcuate segmented encircling attachment wall from a tubular blank, said apparatus comprising
   a plate having a tubular blank receiving central portion having a central axis,
   a plurality of substantially radially extending equally spaced channels lying substantially in a plane in said plate extending outwardly of said central portion,
   a plurality of elongated die members each slidably mounted in one of said channels, said die members having inner arcuate ends substantially defining a circle about said central axis,
   means for constantly resiliently urging said elongated die members outwardly of said central portion in said channels,
   cam means for simultaneously moving said die members toward said central portion to form a tubular blank located in said central portion into a finned member having a plural arcuate segmented encircling attachment wall, and
   means for moving said die members away from said central portion thereby allowing release of the formed finned member.

2. Apparatus in accordance with claim 1 wherein said central portion is formed with an insert therein, said insert comprising a plurality of channels each coaxially aligned with a corresponding channel of said first means.

3. Apparatus in accordance with claim 2 and further comprising,
   a cam plate means for causing pivotable movement of said cam means toward said central portion.

4. Apparatus in accordance with claim 19 and further comprising,
   means for reciprocally moving a mandrel along said central axis.

5. Apparatus in accordance with claim 2 wherein said inner ends of said die members each define an arcuate wall with angular walls flaring outwardly from each arcuate wall.

6. Apparatus in accordance with claim 5 and further comprising means for adjusting inward travel of said die members, said last-mentioned means being accessible from the outside of said apparatus.

7. Apparatus in accordance with claim 6 wherein said plate has a raised, stepped central portion defining cylindrical stepped surfaces, said cam means defining a ring and cams attached to said ring with portions of said cams positioned over one of said stepped surfaces, and said means for adjusting inward travel comprising a plurality of set screws.

References Cited

UNITED STATES PATENTS

| | | | |
|---|---|---|---|
| 2,514,507 | 7/1950 | Mueller | 72—402 |
| 2,586,166 | 2/1952 | Hilstrom | 72—400 |
| 2,686,359 | 8/1954 | Spencer | 29—517 |
| 3,101,100 | 8/1963 | Albrecht | 72—400 |
| 3,349,596 | 10/1967 | Pavlovec | 72—402 |
| 3,370,451 | 2/1968 | Schuetz | 72—402 |

RICHARD J. HERBST, Primary examiner

U.S. Cl. X.R.

113—118